United States Patent
Bishop et al.

[11] Patent Number: 5,940,558
[45] Date of Patent: Aug. 17, 1999

[54] OPTICAL PACKAGING ASSEMBLY FOR TRANSMISSIVE DEVICES

[75] Inventors: David J. Bishop, Summit; Joseph E. Ford, Oakhurst; William M. MacDonald, Lebanon; Rene R. Ruel, Bridgewater; James A. Walker, Howell, all of N.J.

[73] Assignee: Lucent Technologies, Inc., Murray Hill, N.J.

[21] Appl. No.: 08/775,910

[22] Filed: Jan. 2, 1997

[51] Int. Cl.⁶ .................................................. G02B 6/26
[52] U.S. Cl. ................... 385/52; 385/49; 385/31; 385/88; 385/92
[58] Field of Search ................... 385/49–52, 31, 385/88, 89–94, 72, 78

[56] References Cited

U.S. PATENT DOCUMENTS

| | | | |
|---|---|---|---|
| 4,426,440 | 1/1984 | Thompson | 385/129 |
| 4,969,704 | 11/1990 | Stanley | 385/52 |
| 5,065,011 | 11/1991 | Fujihara et al. | 385/49 |
| 5,647,044 | 7/1997 | Basavanhally et al. | 385/92 |
| 5,701,193 | 12/1997 | Vogel et al. | 385/52 |
| 5,740,293 | 4/1998 | Van Rosemburg et al. | 385/92 |
| 5,748,819 | 5/1998 | Szentesi et al. | 385/70 |

FOREIGN PATENT DOCUMENTS

| | | | |
|---|---|---|---|
| 0 226 296 | 6/1987 | European Pat. Off. | 385/52 |
| 0 411 607 A3 | 8/1990 | European Pat. Off. . | |
| 0 729 051 A2 | 2/1996 | European Pat. Off. . | |
| 2 138 161 | 4/1983 | United Kingdom . | |

*Primary Examiner*—Hemang Sanghavi

[57] ABSTRACT

Packaging for a transmissive optical device, methods for manufacturing the packaging, and use of the packaging in an optical communications system are disclosed. The optical package assembly includes a optical package and an optical subassembly. The optical package receives the optical subassembly, which includes a packaging component attached to a transmissive optical device. One end of the optical package receives a first optical fiber that is delivered to a first fiber alignment region in the packaging component. The other end of the optical package receives a second optical fiber that is delivered to a second fiber alignment region in the transmissive optical device. The optical package and fiber alignment regions align the first fiber with the second fiber.

27 Claims, 7 Drawing Sheets

OPTICAL PACKAGING ASSEMBLY FOR TRANSMISSIVE DEVICES

STATEMENT OF RELATED CASES

This specification is related to a copending specification, OPTICAL PACKAGING ASSEMBLY FOR REFLECTIVE DEVICES, filed on even date herewith as Ser. No. 778,119, which will issue as U.S. Pat. No. 5,815,616.

FIELD OF THE INVENTION

The present invention relates to packaging transmissive devices for use in optical systems.

BACKGROUND OF THE INVENTION

Network architectures for two-way optical fiber communications to the home have been proposed. One such architecture is based on a wavelength-division-multiplexed (WDM) network using optical modulators, rather than expensive wavelength-stabilized sources, at each home. The optical modulators are powered by a shared laser source at a central office.

A surface normal optical modulator operating in a reflection mode ("reflective modulators") may be used in such a network. Reflective modulators operate by reflecting, or not reflecting, an optical signal. An optical fiber receives the reflected signal and delivers it to a wavelength router for routing to a receiver in a central office. Packaging for such a reflective modulator is described in Ser. No. 08/712,530, filed Sep. 11, 1996. The packages disclosed therein facilitate removing a splitter normally incorporated in the fiber network, resulting in decreased signal losses.

Further arrangements for reducing signal losses in such a communications network are desirable.

SUMMARY OF THE INVENTION

Packaging for a transmissive optical device, methods for manufacturing the packaging, and use of the packaging in an optical communications system is disclosed. An optical package assembly according to the present invention comprises an optical package and an optical package subassembly. In a first exemplary embodiment, the optical package is a slotted ferrule and the optical package subassembly comprises a packaging component attached to the transmissive optical device. The optical package subassembly is received by a slot in a ferrule facilitating incorporation of the optical device into an optical communications system.

The packaging component has a first fiber alignment region for receiving a first optical fiber. The first fiber alignment region optically aligns the first optical fiber to a window in the packaging component which is in optical communication with the optical device. The optical device has a second fiber alignment region for receiving a second optical fiber for optical communication therewith. In this manner, an optical signal can be delivered to, and received from, the transmissive optical device.

In a second illustrative embodiment of an optical package assembly according to the present invention, the optical package is a slotted ferrule sleeve and the optical subassembly includes a centering disk, in addition to a packaging component and a transmissive optical device. The optical package subassembly is received by a slotted ferrule sleeve. The slotted ferrule sleeve also receives two ferrules, one at each end, through which first and second optical fibers are delivered to the optical package subassembly. The packaging component receives the first fiber in a first fiber alignment region and the optical device receives the second fiber in a second fiber alignment region. An optical signal may thereby be delivered to, and received from, the transmissive optical device.

In an exemplary embodiment of the present invention, the transmissive optical device can be a transmissive modulator residing on a modulator chip. In operation, one of the optical fibers delivers an optical signal to the modulator, which has a membrane suspended over a substrate forming a gap therebetween. As a voltage from a controlled voltage source is applied across the membrane and substrate, an electrostatic force is generated causing the membrane to move towards the substrate. As it does so, the gap changes in size, resulting in a change in the amount of optical energy transmitted through the modulator. By controlling the change in modulator transmissiveness, information can be encoded on the transmitted optical signal. The information-encoded optical energy transmitted through the modulator is received by the other optical fiber.

According to a first method, the packaging component is attached to the modulator chip by first forming a metallized ring-shaped textured region on a surface of the packaging component. A metallic or metallized ridge is also formed on a surface of the modulator chip. The textured region and the metallic ridge are aligned and bonded, thereby attaching the packaging component to the modulator chip.

The first attachment method advantageously forms a hermetic seal around the modulator. The hermetic seal protects the modulator from environmental influences and also facilitates using gases other than air at pressures other than atmospheric within the gap. Also, the ring-shaped regions provide optical alignment of the modulator to the window in the packaging component.

Since the modulator used in both illustrative embodiments operates in a transmissive mode, the modulated optical signal is not reflected, but rather transmitted through the modulator. Thus, a different fiber is used to deliver the input signal and receive the modulated signal. Such an arrangement can be advantageously used to minimize signal losses in a passive optical network.

BRIEF DESCRIPTION OF THE DRAWINGS

Further features of the invention will become more apparent from the following detailed description of specific embodiments thereof when read in conjunction with the accompanying drawings, in which.

DETAILED DESCRIPTION

Figure 1:
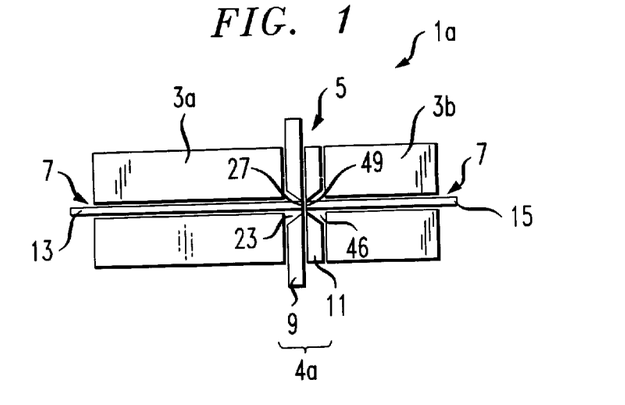
FIG. 1 is a top cross-sectional view of a first illustrative embodiment of an optical package assembly according to the present invention.

FIG. 1 shows a top cross-sectional view of an exemplary first embodiment of an optical package assembly (OPA) 1a for an optically transmissive device 11. A wide variety of transmissive devices 11 can used in the OPA 1a including, without limitation, a transmissive amplitude modulator, a transmissive phase modulator, a transmissive modulator used in analog fashion as a variable attenuator, a polarization rotator, a polarizer, and a wavelength filter.

For the purposes of illustration, the optically transmissive device 11 will be assumed to be a transmissive amplitude modulator. It should be understood that other transmissive devices, including those mentioned above, could be substituted for the modulator in the following description. Use of such other devices in conjunction with the OPA 1a may require modifications or adaptations that are within the capabilities of skilled artisans.

Figure 2:
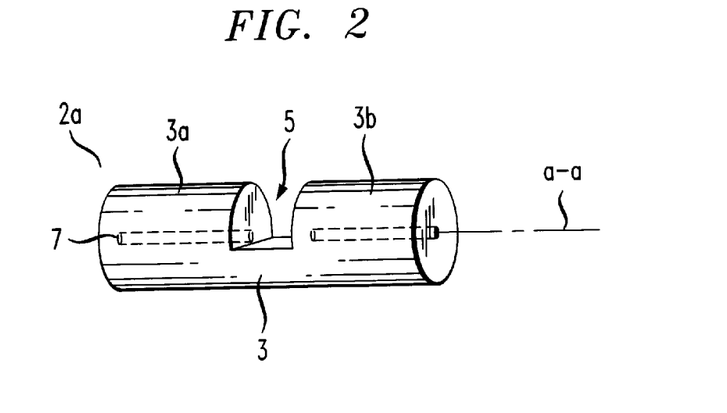
FIG. 2 is a perspective view of an illustrative embodiment of an optical package for receiving an optical package subassembly.

The OPA 1a consists of a optical package (OP) 2a and an optical package subassembly (OSA) 4a. In the OPA 1a, the OP 2a is a ferrule 3 having a transverse opening or slot 5, as shown in perspective view in FIG. 2. In the OPA 1a, the OSA 4a includes a packaging component 9 and the transmissive device 11, which, for the purposes of illustration, is a modulator chip. The OSA 4a is received by the slotted ferrule OP 2a. More particularly, the OSA 4a is received by the slot 5 in the ferrule 3. The slot 5 divides the ferrule 3 into an input portion 3a and an output portion 3b. The ferrule 3 has a bore 7 formed through a longitudinal axis a—a of the ferrule.

An input optical fiber 13 is received by the bore 7 in the input portion 3a of the ferrule 3. The input fiber 13 enters an input fiber alignment region 23 in the packaging component 9 and terminates at a window 27. Similarly, an output fiber 15 is received by the bore 7 in the output portion 3b of the ferrule 3. The output fiber 15 enters a fiber alignment region 46 in the modulator chip 11 and terminates at a window 49. Index matching fluid may be used when positioning an optical fiber within either of the fiber alignment regions 23 or 46.

While single mode optical fiber can be used in conjunction with the present invention, it may be especially advantageous to use expanded mode fiber. Using expanded mode optical fiber increases tolerances to axial separation by increasing the guided mode diameter. See Mitomi et al., "Optical Spot Size Converters for Low Loss Coupling Between Fibers and Optoelectronic Semiconductor Devices," J. Lightwave Tech., v.14, n.7, pp. 1714–20, 1996; Stone et al., "Narrow-Band Field Etalon Filters Using Expanded Core Fibers," J. Lightwave Tech., v.10, n. 12, pp. 1851–54, 1992; Yamagawa et al., "Mode Field Converting Fiber for Coupling to Photonic Devices," Elec. Comm. In Japan Part 2: Electronics, v.77, n.7, pp. 28–37, 1994. These publications, as well as any other publications, patent applications and patents mentioned in this specification are incorporated by reference herein.

Figure 3:
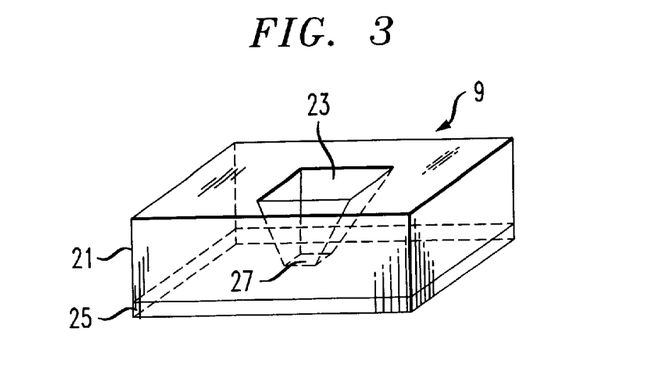
FIG. 3 is a perspective view of an illustrative embodiment of a packaging component according to the present invention used in the optical package subassembly.

A perspective view of the packaging component 9 is provided in FIG. 3. The packaging component comprises a substrate region 21 and a window layer 25. In preferred embodiments, such as the one illustrated in FIG. 3, the input fiber alignment region is formed by a crystallographic etch. As shown, the input fiber alignment region 23 tapers inwardly along a crystallographic etch plane in the substrate region 21 terminating at a window 27 at the window layer 25. The size of the fiber alignment region 23 at the window 27 should be appropriately sized for the diameter of the input fiber 13 to mechanically align the input fiber 13 to the output fiber 15.

In such embodiments, the substrate region 21 is formed from a material suitable for such crystallographic etching. Suitable materials include, without limitation, silicon, gallium arsenide, indium phosphide and germanium. It should be understood that in other embodiments, the fiber alignment region need not be formed by a crystallographic etch or have a taper as shown in FIG. 3.

Figure 4:
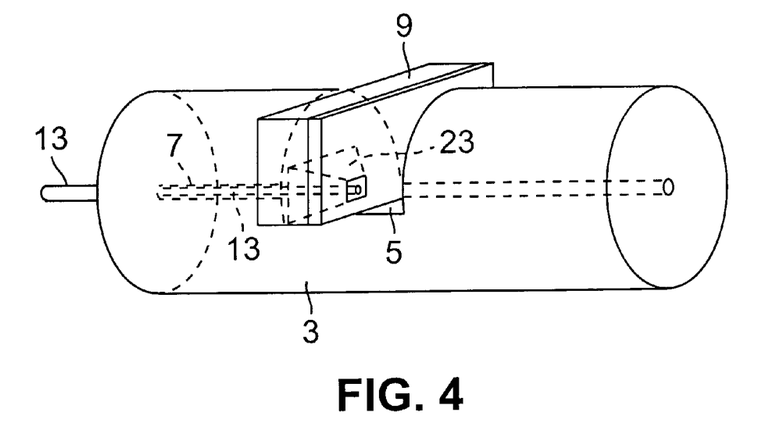
FIG. 4 is a perspective view of the packaging component of FIG. 3 being received by the optical package of FIG. 2.

The window layer 25 should be optically transparent at the operating wavelengths of the modulator chip. Furthermore, the window layer 25 should be formed of a material that etches at a much slower rate than the substrate region 21, thereby functioning as a etch-stop for the crystallographic etch that forms the fiber alignment region 23 in preferred embodiments. Suitable materials for the window layer 25 include, without limitation, high pressure steam oxide (HiPOx), thermal oxide and silicon nitride. In presently preferred embodiments, the window layer is HiPOx having a thickness in the range of about 5 to 15 microns. A perspective view showing the packaging component 9 within the slot 5 and receiving the input optical fiber 13 is provided in FIG. 4.

Figure 5:
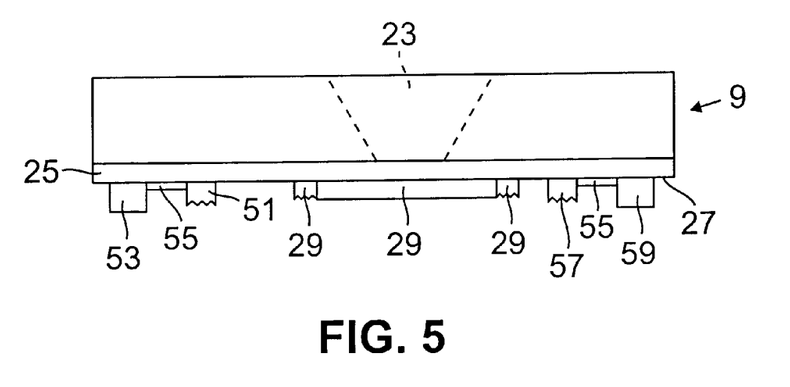
FIG. 5 is a cross-sectional view of the packaging component of FIG. 3.

FIG. 5 illustrates further features of the packaging component 9 that are used for attachment to the modulator chip 11. In particular, the surface 27 of the window layer 25 includes a raised or textured region 29. The textured region 29 is ring-shaped, and is metallized to facilitate bonding with the modulator chip 11, as described in more detail later in this specification.

Additionally, discrete textured regions or solder bumps 51, 57 are disposed on the surface 27 outside the region enclosed by the textured region 29. The region 51 is in electrical connection with a wire bond pad 53 via a runner 55, and the region 57 is in electrical contact with a wire bond pad 59. Wires, not shown, bonded to the bond pads 53, 59 and in electrical connection with a controlled voltage source, deliver a voltage across the modulator as appropriate when the packaging component 9 is bonded thereto.

Figure 6A:
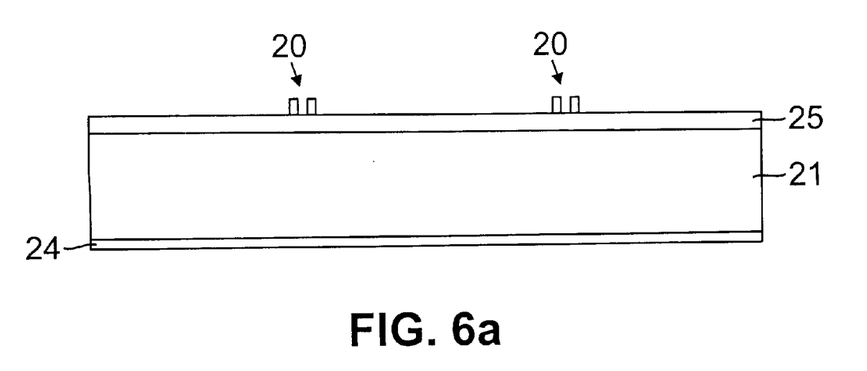
FIGS. 6a–6d show the packaging component in various stages of completion by way of illustration of a method for making the packaging component.
Figure 6B:
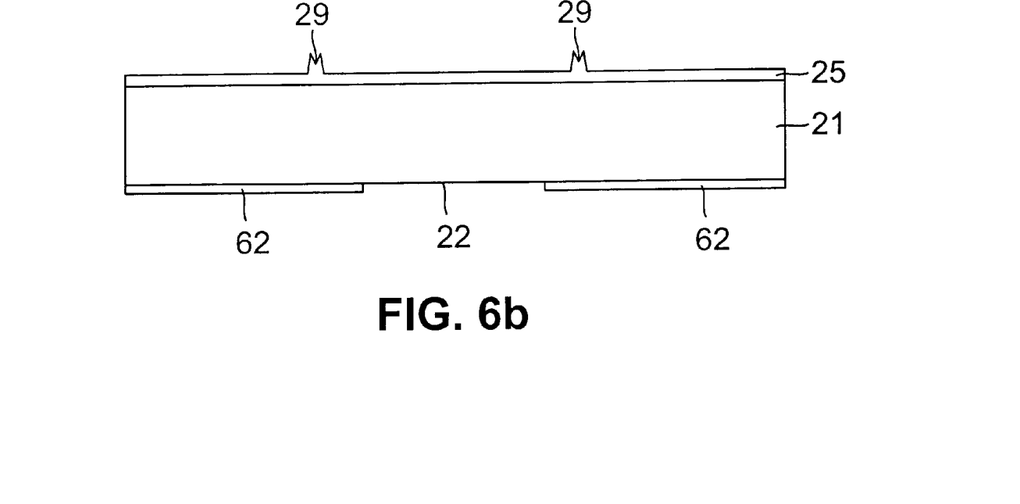

The formation of the fiber alignment region 23 and textured region 29 is illustrated in FIGS. 6a–6d. Photolithographic techniques are used. FIG. 6a shows the window layer 25 and substrate region 21. A ring-shaped mask 20 is disposed on the window layer 25 and a layer of polysilicon 24 is disposed on the substrate region 21. The raised ring-shaped region 29 is patterned in the window layer 25 and an etch mask 62 is patterned in the polysilicon layer 24 on the substrate region 21. FIG. 6b shows the textured region 29 and the etch mask 62.

Figure 6C:
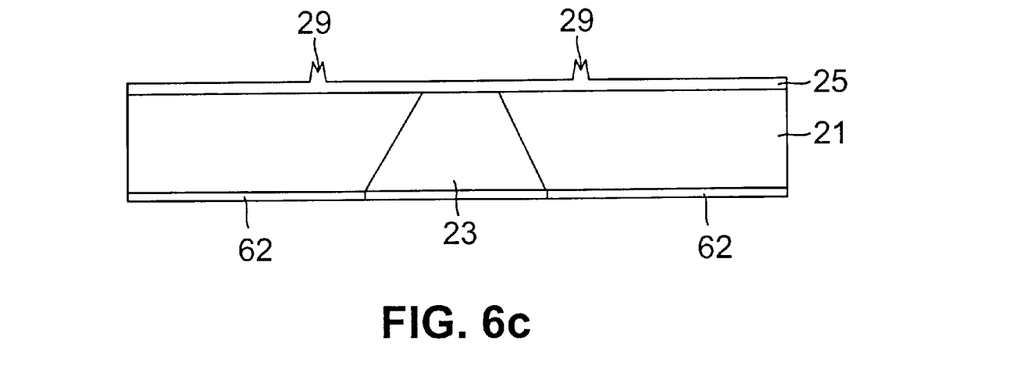
Figure 6D:
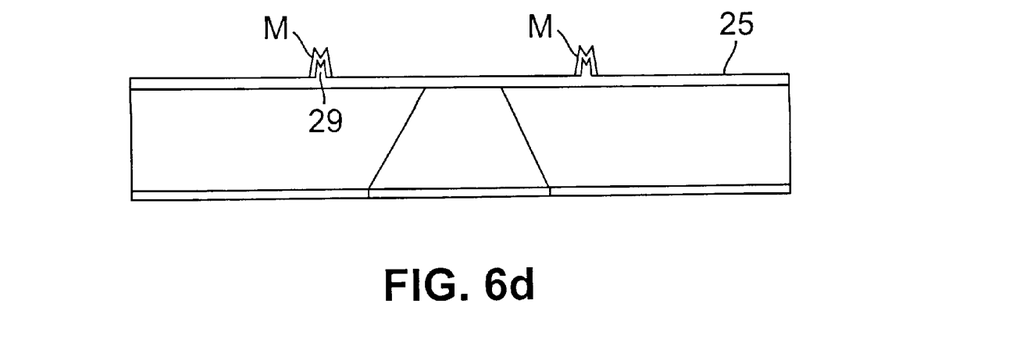

Etchant is applied, etching the substrate region 21 from the surface 22 along a crystallographic etch plane and terminating at the window layer 25. FIG. 6c shows the fiber alignment region 23 etched in the substrate region 21. An anti-reflection coating is then optionally deposited on window layer 25. Metal M is deposited on the textured region and the appropriate wire bond pads 53, 59 and runners 55 are formed. The metallized textured region 29 is shown in FIG. 6d.

Figure 7:
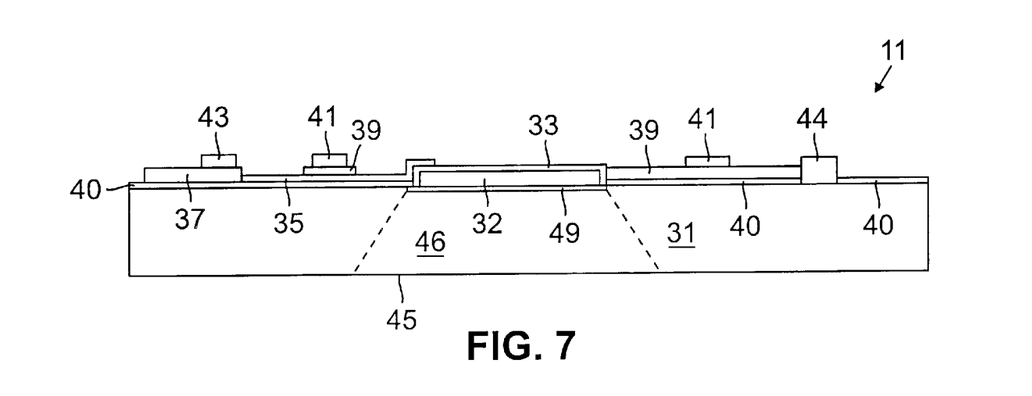
FIG. 7 is an illustrative embodiment of a transmissive optical device for use in conjunction with the present invention.

An exemplary embodiment of the modulator chip 11 is shown in FIG. 7. The chip 11 includes a membrane 33 that is suspended above a substrate 31, defining a gap 32. Modulator configurations suitable for use in conjunction with the present invention include surface normal micromechanical optical modulators such as those disclosed in U.S. Pat. No. 5,500,761, and U.S. patent applications Ser. No. 08/283,106 filed Jul. 29, 1994, Ser. No. 08/578,590 filed Jun. 7, 1995, Ser. No. 08/479,476 filed Jun. 7, 1995, Ser. No. 08/578,123 filed Dec. 26, 1995, Ser. No. 08/565,453 filed Feb. 1, 1996, and Ser. No. 08/597,003 filed Feb. 5, 1996.

Most of the aforementioned modulator designs can achieve zero reflectivity, i.e., 100 percent transmission through the membrane. The maximum reflectivity attained by most of such designs, however, is about eighty percent. This equates to 20 percent transmission through the membrane. Thus, if such modulators are operated in the transmissive mode, the contrast ratio is only about 5 to 1.

In a presently preferred embodiment, a Fabry-Perot modulator having a movable layer, i.e., membrane, characterized by a particular arrangement of dielectric layers of specified thickness is used in conjunction with the present invention. Such a modulator is expected to achieve about 95 percent reflectivity, i.e., 5 percent transmission, resulting in a substantially improved contrast ratio of about 20 to 1. The device comprises a silicon substrate, a layer of silicon nitride disposed thereon, a first layer of polysilicon on the silicon nitride layer, and a second layer of polysilicon suspended over the first layer of polysilicon creating a gap therebetween. The silicon nitride layer and the first layer of polysilicon have a thickness of one-quarter of a wavelength of the optical signal being modulated, as measured in the layers. The second layer of polysilicon has a thickness of three quarters of a wavelength of the optical signal, as measured in the layer.

Figure 8:
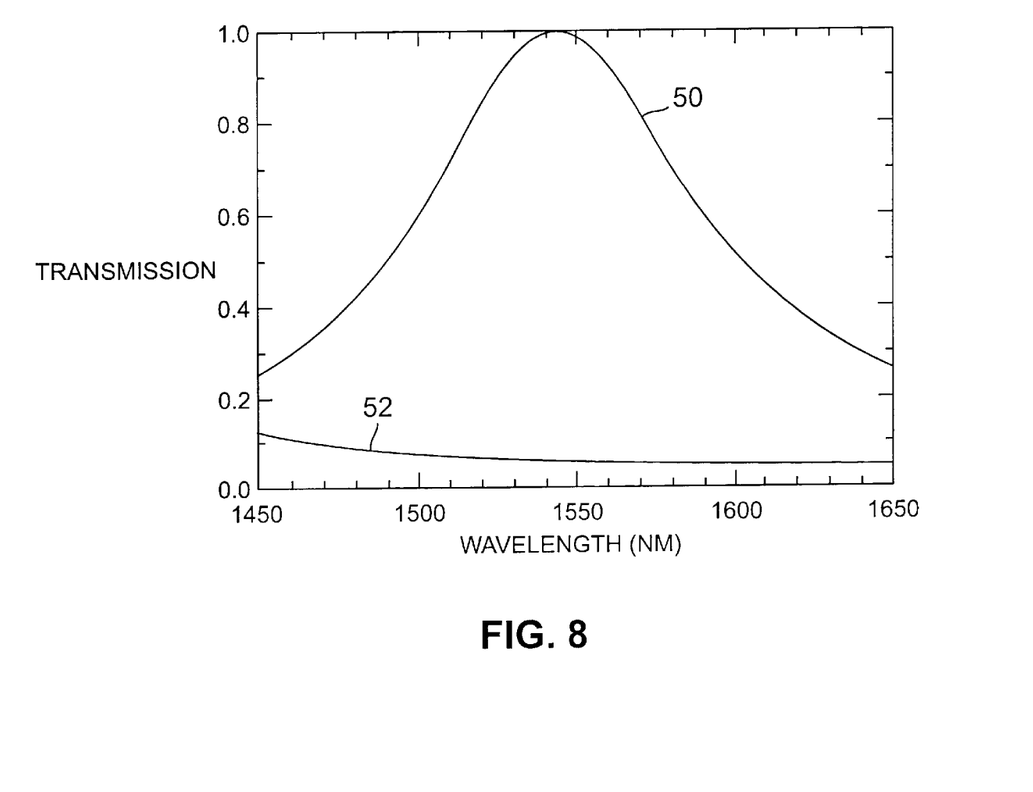
FIG. 8 is a plot of transmissivity versus wavelength for a preferred embodiment of a transmissive micromechanical modulator.

A plot of transmissivity versus wavelength for the preferred modulator is shown in FIG. 8. The curve identified by reference numeral 50 shows the highly transmissive state of the modulator, while the curve 52 shows the low transmission state. The gap between the first and second polysilicon layers is about one-half of a wavelength of the optical signal (at 1550 nanometers) in the highly transmissive state. In the low transmission state, the gap is about 38 percent of a wavelength of the optical signal.

With continuing reference to FIG. 7, the surface 45 of the substrate 31 is etched to provide a fiber alignment region 46 for receiving the output fiber 15. The alignment region is formed by a method similar to that used for etching the fiber-alignment region 23 in the packaging component 9. A timed etch is used in preference to using an etch stop, however. An etch stop could be used if desired. A suitable etch stop would be an epitaxial layer of heavily doped silicon, approximately 5 to 10 microns in thickness, which is deposited on the surface 47 of the substrate 31 during modulator fabrication. Care must be taken to ensure that the dopant, at the prevailing levels, does not deleteriously affect the optical properties of the modulator. If a timed etch is used, the fiber alignment region 46 terminates in a window 49 in the substrate 31 that is approximately 5–10 microns thick.

Figure 9:
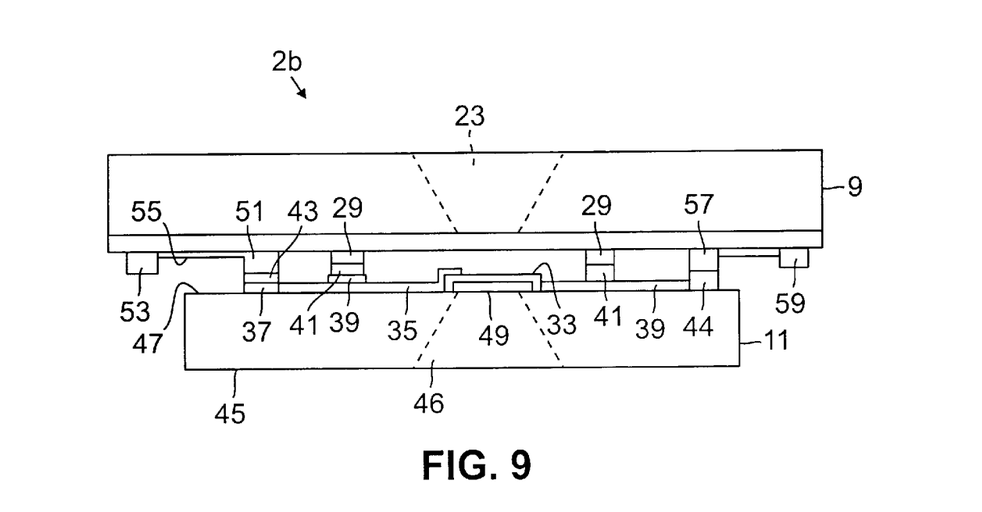
FIG. 9 shows the packaging component of FIG. 5 attached to the transmissive optical device of FIG. 7 forming an embodiment of an optical packaging subassembly.

A layer 40 of material is disposed on the substrate 31 except on the region beneath the membrane 33. The layer 40, which can be silicon nitride, silicon oxide or phosphoro silicate glass (PSG), for example, is deposited during formation of the modulator structure. Its relevance here is that it provides electrical insulation between the substrate 31 and an electrical runner 35 and wire bond pad 37 that are deposited on the layer 40. The electrical runner provides electrical connection between the membrane 33 and the contact or wire bond pad 37. An insulating region 39, formed of material such as, without limitation, silicon oxide or silicon nitride, is disposed on the electrical runner 35. A bump 43 of solder, etc. is disposed on the wire bond pad 37. The solder bump 43 is located so that when the modulator chip 11 is attached to the packaging component 9, as shown in FIG. 9, the solder bump aligns with and bonds to the textured region 51 on the packaging component 9. The modulator membrane 33 is thereby placed in electrical contact with the bond pad 53 on the packaging component 9.

If the modulator is formed using a method wherein the layer 40 is not present on the substrate 31, then provisions should be made to electrically isolate the electrical runner 35 and wire bond pad 37 from the substrate 31 to prevent shorting.

With continuing reference to FIG. 7, a bump 44 of solder or other suitable material is disposed on the substrate 31. The insulating layer 39 is disposed on the substrate 31 leading to the bump 44. The insulating layer 39 is not required for the purpose of electrical isolation since electrical contact via the bump 44 is to the substrate 31, not the membrane 33. Providing the insulating layer 39 in that region aids in achieving a consistent height for a ring-shaped ridge 41 of solder or the like disposed thereon. The bump 44 is located so that it aligns and bonds with the textured region 55. The modulator substrate 31 is thereby placed in electrical contact with bond pad 59 on the packaging component 9.

The aforedescribed arrangement of solder bumps and bond pads and electrical runners advantageously transfers electrical contact with the controlled voltage source from the modulator chip 11 to the packaging component 9. Such transfer protects the modulator from damage. Other configurations capable of transferring electrical contact as described above may suitably be used.

The packaging component 9 and the modulator chip 11 are bonded at the metallized ring-shaped textured region 29 and the ring-shaped ridge 41. As described above, bonding also occurs between textured regions 51, 57 and bumps 43, 44, respectively. Conventional solder bonding can be used. In preferred embodiments, textured compression bonding, as described in U.S. Pat. No. 5,291,572, is used. Once bonded, as shown in FIG. 9, the textured region 29 forms a hermetic seal around the modulator's membrane 33. The membrane 33 is positioned so that when bonded, it is aligned with the window 27 in the packaging component 9.

The bonding operating thus advantageously fixes the alignment between the packaging component 9 and the modulator's membrane 31, transfers the electrical contact from the modulator chip 11 to the packaging component 9, and provides a hermetic seal around the modulator.

In operation, an optical signal is carried by the input fiber 13 to the window 27 in the packaging component 9. The signal passes through the window 27 and is received by the modulator membrane 33. To encode information onto the signal, a voltage is delivered across the membrane 33 and substrate 31 from a controlled voltage source. As the voltage is applied, the membrane moves toward the substrate resulting in a change in the size of the gap 32. Changing the size of the gap 32 results in a change in the transmissiveness of the modulator. The pattern of variations in the optical energy delivered to the output fiber 15 resulting from the controlled change in transmissiveness provides information content, i.e., modulates the signal.

It should be appreciated that in other embodiments, the packaging component 9 can receive the output fiber 15 and the transmissive device 11 can receive the input fiber 13 as is appropriate for a particular application.

Figure 10:
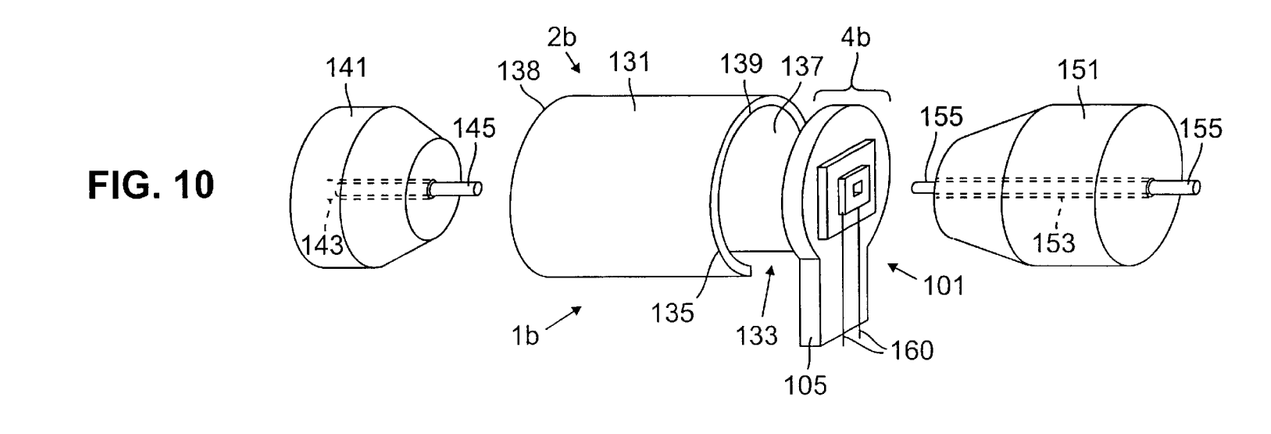
FIG. 10 is an exploded view of a second illustrative embodiment of an optical package assembly according to the present invention and optical fibers for incorporating the optical package into a fiber-optic system.
Figure 11:
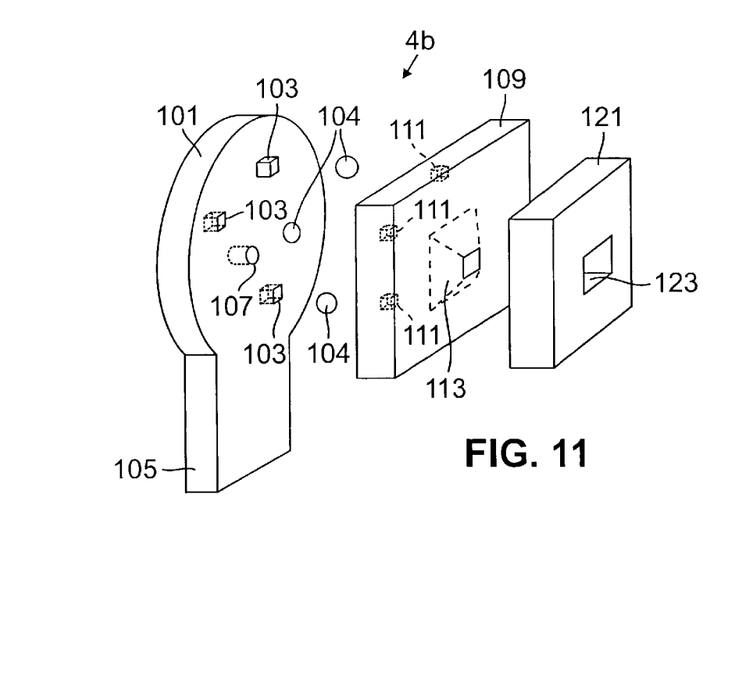
FIG. 11 is an exploded view of an illustrative embodiment of an optical package subassembly.

A second embodiment of an OPA 1b for a transmissive device 11 is shown in an exploded view in FIG. 10. The OPA 1b includes an OP 2b and an OSA 4b. In the OPA 1a previously described, the OP 2a is a slotted ferrule, shown in perspective view in FIG. 2. In the OPA 1b, the OP 2b is a slotted ferrule sleeve 131. The OP 2b receives the OSA 4b, which, as shown in FIG. 11, includes a centering disk 101, a packaging component 109 and a transmissive device 121. The packaging component 109 and the transmissive device 121 can be identical in structure to the packaging component 9 and the transmissive device 11 of the OPA 1a. Again, for the purposes of illustration, the transmissive device 11 is assumed to be a transmissive modulator on a modulator chip.

As illustrated in FIG. 11, the centering disk 101 and packaging component 109 preferably have complementary alignment/mating features 103 and 111, respectively, which facilitate mating and/or aligning the packaging component 109 with the centering disk 101. A variety of different types of alignment/mating features known to those skilled in the art can be used. For example, as shown in FIG. 10, alignment holes 103, 11 may be placed in the centering disk 101 and the packaging component 109, respectively, which holes receive alignment spheres 104. Alternatively, solder bumps can be used for alignment.

The modulator chip 121 is mated to the packaging component 109. In preferred embodiments, the modulator chip 121 and the packaging component 109 are mated using the methods described above in conjunction with the OSA 4a for providing a hermetically sealed modulator. Alternatively, alignment spheres or other alignment/mating features known to those in the art can be employed for aligning and mating the packaging component to the modulator chip. It should be appreciated that such other alignment/mating features can be used in conjunction with the OSA 4b, as well.

The packaging component 109 and the modulator chip 121 each have a fiber alignment region 113, 123, respectively, identical to the fiber alignment regions for the packaging component 9 and modulator chip 11 of the OSA 4a. The modulator chip 121 includes a transmissive modulator, and both the packaging component 109 and the modulator chip 121 include appropriate wire traces and the like for electrical connection as described above in conjunction with the OSA 4a. The centering disk 101 has a bore 107 aligned with the fiber alignment regions 113 and 123.

Returning to FIG. 10, The OSA 4b is received by the ferrule sleeve 131, which has a longitudinal slot 133 extending through a wall 135 to the interior 137 of the ferrule sleeve. The centering disk 101 includes a tab 105 for locating the centering disk within the ferrule sleeve 131 and preventing its rotation. The centering disk 101 is suitably thick to prevent any tilting of the OSA 4b within the ferrule sleeve 131.

The OSA 4b can be integrated into a fiber-optic system by receiving two ferrules 141, 151, one on each side of the OSA 4b, which can deliver respective optical fibers 145, 155 to the transmissive device, i.e., modulator. An end 138 of the ferrule sleeve 131 receives the first ferrule 141. The ferrule 141 includes a bore 143 running axially therethrough for receiving the optical fiber 145. The fiber 145 passes through the bore 107 in the centering disk 101 and is received by the fiber alignment region 113 of the packaging component 109. The second ferrule 151 is received by an end 139 of the ferrule sleeve 131. The ferrule 151 has a bore 153 running axially therethrough for receiving an optical fiber 155. The optical fiber 155 is received by the fiber alignment region 123 in the modulator chip 121.

Electrical leads 160 for placing the modulator in electrical connection with a controlled voltage source, not shown, project down through the slot 133 in the ferrule sleeve 131.

Figure 12:
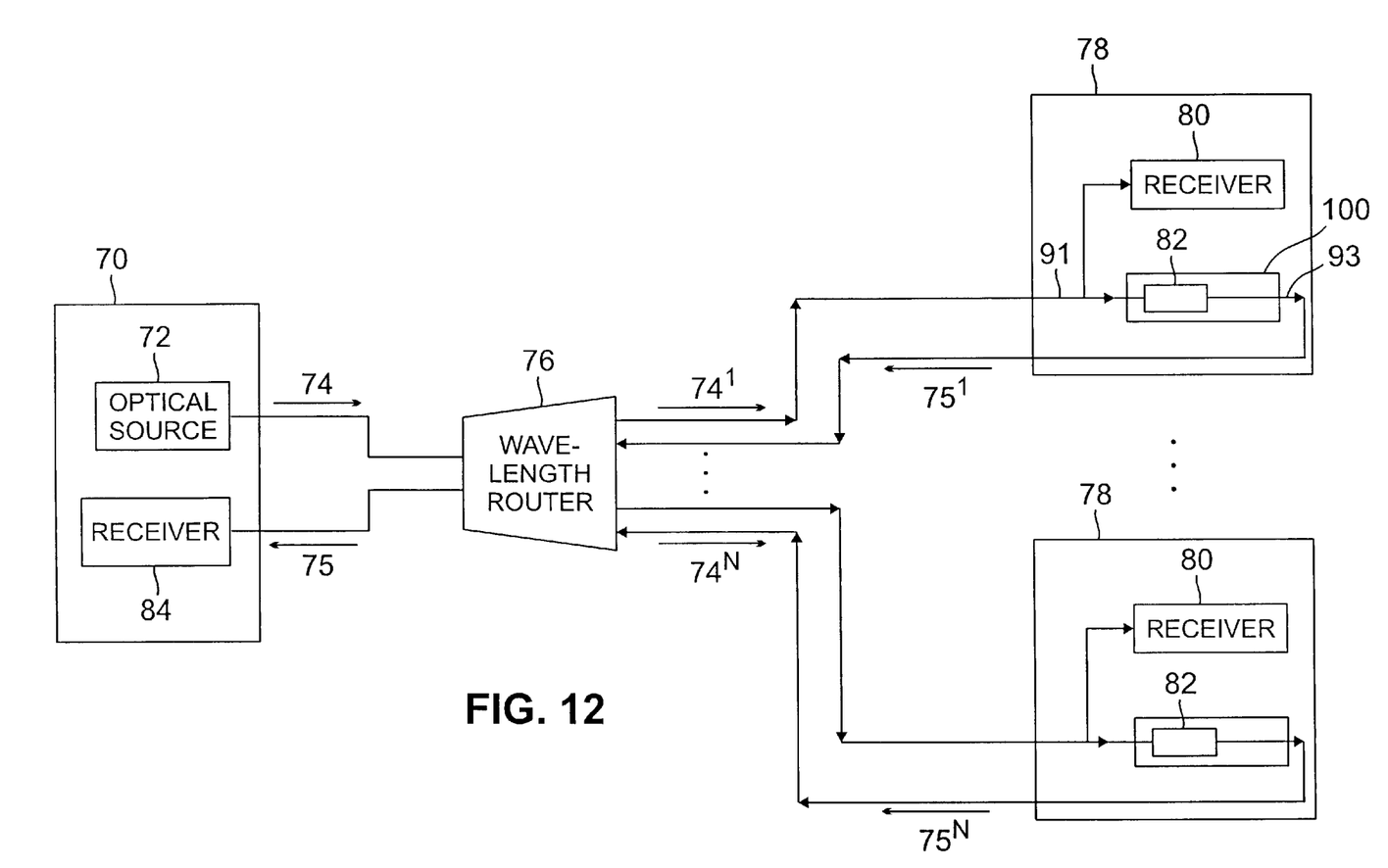
FIG. 12 is an exemplary embodiment of a passive optical network incorporating an optical package assembly according to the present invention.

Among other uses, the OPAs 1a and 1b according to the present invention can be used to provide low signal loss passive optical networks, such as the exemplary network shown in FIG. 12. The network includes a central office or head end terminal 70 having an active optical source 72, i.e., a transmitter, such as a multi-frequency laser or light-emitting diode. The central office sends information via an optical signal 74, in WDM format, to a plurality of optical network units (ONUs) 78 over a first optical medium, such as optical fiber. Each ONU 78 receives such information on a prescribed wavelength. A wavelength routing device 76 demultiplexes the optical signal 74 into its spectral components $74^{1-N}$, and routes each of such spectral components to the appropriate ONU 78, i.e., the spectral component having a wavelength matching the prescribed wavelength of the ONU is routed thereto.

Each ONU 78 includes a receiver 80, such as a photodetector, and a modulator 82 contained in an OPA 100 according to the present invention, such as the exemplary OPAs 1a and 1b. The ONU also includes a splitter, not shown, wherein a minor portion of the power of the spectral component $74^i$ received by the ONU is routed to the receiver 80, and the balance, less insertion loss, is routed to the modulator 82. For example, in a preferred embodiment, 10 percent of the power can be routed to the receiver 80.

Information may be sent in packets to the ONU 78 via the spectral component $74^i$. Each packet contains a portion of information for processing by the ONU 78, as well as a portion of continuous-wave (CW) light or "optical chalkboard" upon which information can be encoded by the modulator. The optical signal is delivered to the OPA 100 over an input fiber 91. The optical energy reaching the receiver 80 is converted to an electrical signal, representative of the information contained in the packet, and routed to processing electronics, not shown. The modulator 82 encodes information on the CW portion, returning information-carrying spectral component $75^i$, which is carried along an output fiber 93 of the OPA. Since the modulator operates in a transmissive fashion, the information-carrying spectral component is not returned to the same fiber that delivered it, i.e., fiber 91, as in some implementations of networks using reflective modulators. Thus, a second pass through the splitter is avoided.

The information-carrying spectral components $75^{1-N}$ returned from the ONUs 78 over a second optical medium are multiplexed by the wavelength routing device 76 into an optical signal 75, which is routed to a receiver 84 in the central office 70.

Although a number of specific embodiments of this invention have been described herein, it is to be understood that such embodiments are merely illustrative of the many possible specific arrangements that can be devised in application of the principles of this invention. Numerous and varied other arrangements can be devised in accordance with these principles by those of ordinary skill in the art without departing from the scope and the spirit of the invention.

We claim:

1. An article comprising an optical packaging subassembly having:

a packaging component having a first fiber alignment region for receiving a first optical fiber;

a transmissive optical device attached to the packaging component, the optical device including a second fiber alignment region for receiving a second optical fiber, wherein, the first and second fiber alignment regions optically align the first optical fiber to the second optical fiber so that one of either the first or second optical fiber can deliver a first optical signal to the transmissive optical device and the other fiber can receive a second optical signal transmitted by the transmissive optical device.

2. The optical packaging subassembly of claim 1 wherein the transmissive optical device is a modulator disposed on a modulator chip.

3. The optical packaging subassembly of claim 1, wherein the packaging component and the transmissive optical device have complementary alignment/mating features for aligning and mating one to the other.

4. The optical packaging subassembly of claim 3, wherein the alignment/mating feature of the packaging component is a metallized ring-shaped textured region and the alignment/mating feature of the transmissive optical device is a ring-shaped bump of metal, and further wherein bonding the metallized ring-shaped textured region to the ring-shaped bump of metal forms a hermetic seal around at least a portion of the transmissive optical device.

5. The optical packaging subassembly of claim 4 wherein the transmissive optical device is a modulator.

6. The optical packaging subassembly of claim 1 wherein bores define the first and the second fiber alignment regions in the packaging component and the transmissive optical device, respectively.

7. The optical packaging subassembly of claim 6 wherein the bores are characterized by a taper, the angle of which taper is dictated by a crystallographic etch plane.

8. The optical packaging subassembly of claim 7, wherein the packaging component comprises a substrate region and a window layer, wherein the first fiber alignment region receives the first optical fiber at a surface of the substrate region and terminates at the window layer.

9. The optical packaging subassembly of claim 8 wherein the window layer is formed from high pressure steam oxide.

10. The optical packaging subassembly of claim 2 wherein the modulator chip has an electrical connection to wire bond pads on the packaging component so that electrical connection between off-chip electronics and the modulator can be made at the packaging component.

11. The optical packaging subassembly of claim 2 wherein the modulator comprises:

a silicon substrate, a layer of silicon nitride disposed on the silicon substrate, the layer having a thickness of one-quarter of a wavelength of the first optical signal, as measured in the layer;

a first layer of polysilicon on the silicon nitride layer having a thickness of one-quarter of a wavelength of the first optical signal, as measured in the layer; and a second layer of polysilicon having a thickness of three quarters of a wavelength of the first optical signal, as measured in the layer, the second layer suspended over the first layer of polysilicon creating a gap therebetween.

12. The optical packaging subassembly of claim 1, further comprising a centering disk attached to the packaging component, the centering disk having a bore therethrough for receiving the first optical fiber and a circumferentially-located projection depending therefrom.

13. The optical packaging assembly of claim 1 further comprising the first and second optical fibers, wherein the first and second optical fibers are connected to a passive optical network.

14. The article of claim 1, wherein the article is an optical package for use in integrating a transmissive optical device into a fiber-optic system, and wherein the article comprises, in addition to said optical packaging subassembly, an arrangement for receiving the optical package subassembly.

15. The article of claim 14, wherein the arrangement comprises:

a ferrule having a transverse slot formed therein and having a bore formed through a longitudinal symmetry axis thereof.

16. The article of claim 14, wherein the arrangement comprises:

a cylindrical wall having a longitudinal slot therethrough defining a ferrule sleeve; and a centering disk received by the ferrule sleeve, the centering disk having a first circular portion suitably sized to be received within an inner circumference of the cylindrical wall, and further having a bore through its center, the bore aligning with a central longitudinal axis of the ferrule sleeve and having a size sufficient to allow an optical fiber to pass therethrough; and a second portion projecting beyond a circumference defined by the first circular portion and extending through the longitudinal slot of the ferrule sleeve thereby fixing the rotational orientation of the received centering disk.

17. The article of claim 16, further comprising first and second ferrules received by respective first and second ends of the ferrule sleeve and on opposite sides of the centering disk.

18. The article of claim 16, wherein said packaging component is attached to said centering disk, wherein the first fiber alignment region of the packaging component is axially aligned with the bore in the centering disk.

19. The article of claim 18, further comprising the first and the second optical fibers, wherein the first optical fiber passes through the first ferrule, the bore in the centering disk and is ultimately received by the first fiber alignment region in the packaging component, and wherein the second optical fiber passes through the second ferrule and is received by the second fiber alignment region in the transmissive optical device.

20. The article of claim 1, wherein the article comprises an optical communications system and said transmissive optical device is a transmissive optical modulator, said communications system including:

a head end terminal;

a transmitter for launching optical signals, intended for at least one of a plurality of individual subscribers, into a first optical medium;

a receiver for receiving optical signals on a second optical medium from at least one of the plurality of individual subscribers; and a plurality of optical network units, each of the optical network units including a modulator chip having said transmissive modulator contained in said optical packaging subassembly, wherein said transmissive modulator is in optical communication with said first and second optical mediums.

21. An optical package assembly comprising:

a transmissive optical device having a fiber alignment region; and a ferrule having a transverse slot formed therein and having a bore formed through a longitudinal axis thereof; wherein the transmissive optical device is received by the transverse slot and an optical fiber in the bore is received by the fiber alignment region of the transmissive optical device.

22. An optical package assembly for use in integrating a transmissive optical device into a fiber-optic system, comprising:

a packaging component having a first fiber alignment region for receiving a first optical fiber;

a transmissive optical device attached to the packaging component, the optical device including a second fiber alignment region for receiving a second optical fiber; and a receiving structure physically adapted to receive the packaging component and the optical device and to optically align the first optical fiber with the second optical fiber.

23. The optical package assembly of claim 22 wherein the receiving structure comprises:

a ferrule having a tranverse slot formed therein and having a bore formed through a longitudinal symmetry axis thereof, wherein, the packaging component and the optical device are received by the transverse slot and wherein a first end of the bore receives the first optical fiber and a second end of the bore receives the second optical fiber, and further wherein a bottom of the slot has sufficient radial depth so that the first and second optical fibers are in optical communication with the transmissive optical device received by the slot.

24. The optical package assembly of claim 22 further comprising the first and the second optical fibers.

25. The optical package assembly of claim 22 wherein the transmissive optical device is a modulator disposed on a modulator chip.

26. The optical package assembly of claim 25 wherein attaching the packaging component to the modulator hermetically seals the modulator.

27. The optical packaging assembly of claim 26 wherein the modulator comprises:

a silicon substrate, a layer of silicon nitride disposed on the silicon substrate, the layer having a thickness of one-quarter of a wavelength of the first optical signal, as measured in the layer;

a first layer of polysilicon on the silicon nitride layer having a thickness of one-quarter of a wavelength of the first optical signal, as measured in the layer; and a second layer of polysilicon having a thickness of three quarters of a wavelength of the first optical signal, as measured in the layer, the second layer suspended over the first layer of polysilicon creating a gap therebetween.

* * * * *